United States Patent [19]

Davis

[11] 4,052,594

[45] Oct. 4, 1977

[54] MARK READER WITH IMPROVED MARK SENSING HEADS

[75] Inventor: Loren Roger Davis, South Pasadena, Calif.

[73] Assignee: Bourns, Inc., Riverside, Calif.

[21] Appl. No.: 671,897

[22] Filed: Mar. 29, 1976

[51] Int. Cl.² .................. G06K 7/14; G06K 7/08; G11B 5/12

[52] U.S. Cl. .................. 235/61.11 E; 235/61.11 D; 360/110

[58] Field of Search .................. 360/110, 122, 128; 235/61.11 E, 61.12 N, 61.11 D; 250/569, 566

[56] References Cited

U.S. PATENT DOCUMENTS

| | | | |
|---|---|---|---|
| 2,926,982 | 1/1960 | Nafius | 360/122 |
| 3,686,466 | 8/1972 | Sato | 360/110 |
| 3,801,776 | 4/1974 | Goeppinger | 235/61.11 E |
| 3,836,754 | 9/1974 | Toye | 235/61.12 N |
| 3,868,514 | 2/1975 | Israelsson | 250/566 |
| 3,912,909 | 10/1975 | Harrison | 235/61.11 E |
| 3,919,447 | 11/1975 | Kilmer | 235/61.11 E |

Primary Examiner—Robert M. Kilgore
Attorney, Agent, or Firm—Paul H. Ware; William G. Becker

[57] ABSTRACT

A document reader having a pair of improved sensing heads for reading marks on both sides of a document. Each head comprises a body portion equipped to transmit radiation onto a document and sense radiation reflected back from marks on the document. A substantially transparent, ultra high molecular weight polyethylene film secured to the body portion over the transmitting and receiving apparatus shields the body portion from wear by passing documents. With the film in place it is possible to avoid wrapping the documents about the sensing heads, a procedure that is otherwise desirable for accurate mark reading, and thereby further reduce wear.

18 Claims, 6 Drawing Figures

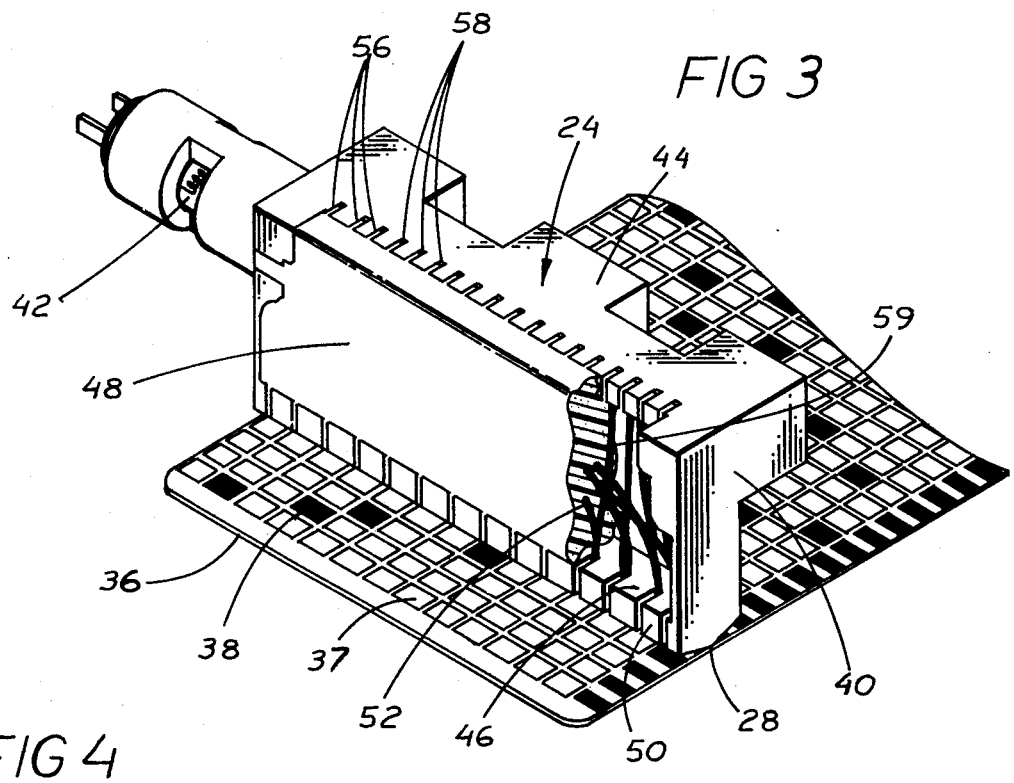
FIG 3
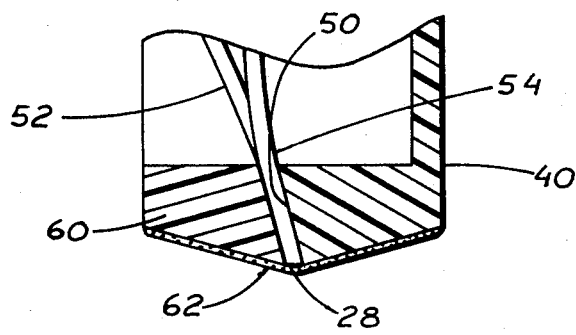
FIG 4
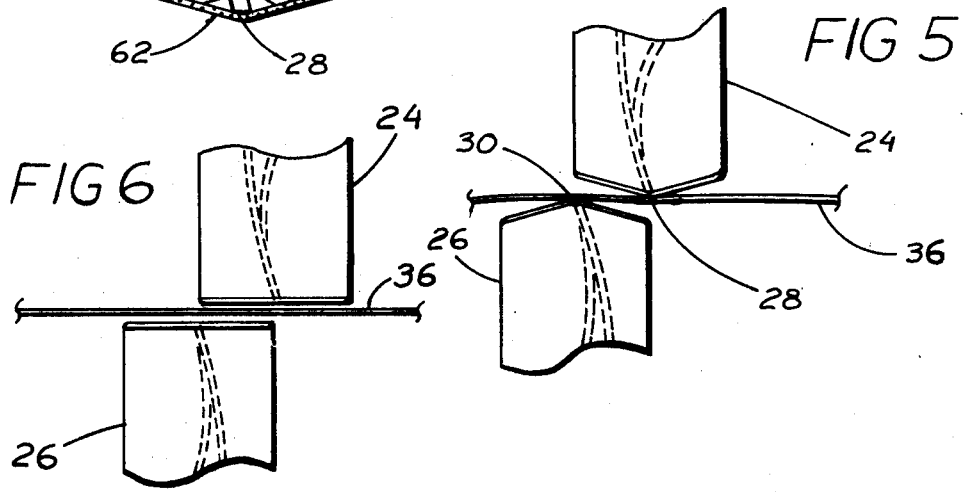
FIG 5
FIG 6

MARK READER WITH IMPROVED MARK SENSING HEADS

BACKGROUND OF THE INVENTION

This invention relates to document readers, and more particularly to readers having sensing heads arranged to read both sides of a document.

In previous devices for reading marks on both sides of a document, it has been found desirable to have the document wipe directly against the mark sensing heads to ensure that all marks on the card are detected. One arrangement for accomplishing this result employs sensing heads with reading ends formed in a V-shape, each of the sensing heads having transmitting and receiving optical fibers which terminate along the apex of the "V". Radiation emitted from the transmitting fibers is reflected back to the receiving fibers by marks on the document to indicate the presence of a mark. The heads are positioned on opposite sides of the card path and mutually offset in the direction of document travel with their reading ends overlapping in a direction normal to the document surface. Passing documents are thereby slightly wrapped around the apex of each head and wipe against the apices during transit through the reader.

While the wiping contact between the document and sensing heads does perform its intended function of keeping the document on a precise transport path relative to the heads, a serious wear problem arises because of the abrasive nature of typical documents such as computer cards. The sensing head is typically formed from a plastic which wears away under repeated wiping by many cards. This exposes the optical fibers to abrasion by the cards, and the fibers also become worn. After initially reading perhaps 50,000 cards, it has been found that the sensitivity of the sensing heads is changed to such an extent due to wearing of the optical fibers that adjustment of a circuit which amplifies the reflected radiation signals is necessary. Thereafter the sensing heads continue to degrade as more cards are read, but at a slower rate, with adjustment being required every 100,000 to 250,000 cards or so. The adjustment rate depends on such factors as the surface characteristics and weight of the cards, the construction of the sensing heads, and the required reading accuracy. Eventually a point is reached at which the sensing heads are unusable and must be replaced.

In addition to the wear problem, repeated card wiping produces a carbon buildup on the optical fibers by transferring carbon from the card marks to the fibers. This reduces the reading capability with respect to both the amount of radiation that can be directed onto a card, and the amount of reflected radiation that is sensed by the heads.

SUMMARY OF THE INVENTION

In view of the above problems associated with the prior art, it is the principal object of the present invention to provide a reader for both sides of a document in which wear on the sensing heads due to repeated card readings is greatly reduced and the longevity of the heads correspondingly increased.

Another object of the invention is the provision of novel and improved mark sensing heads which exhibit greatly improved wear characteristics when wiped successively by a great number of documents.

A further object of the invention is the provision of sensing heads for a document reader which suffer no serious carbon buildup even after being wiped by many documents.

Another object of the invention is the provision of a novel and improved document reader sensing head which can be wiped by a passing document and yet effectively separates the document from sensing elements housed in the head, thereby inhibiting wear on those elements.

Still another and important object of the present invention is the provision of a reader for both sides of a document in which accurate reading can be achieved without significant wiping of the documents against mark sensing heads.

Each of the above objects is achieved in the present invention by providing a card reader sensing head which comprises a body portion, transmitting means lodged in the body portion for transmitting radiation from a radiation source onto a document passed by the sensing head, receiving means lodged in the body portion for receiving radiation reflected off the document, and a substantially transparent, ultra high molecular weight polyethylene film secured to the body portion and overlying the transmitting and receiving means. The reader is capable of operating in either of two modes. In the first mode the sensing heads are laterally offset from each other in the direction of document travel and mutually overlapping in a direction normal to the flat surface of a document transported between them so as to cause the document to wrap around the sensing heads and wipe against the portion of the heads proximate to the transmitting and receiving means. In this mode the transmitting and receiving means are separated from the card by substantially the film thickness. The film absorbs abrasive wiping by the document and thereby greatly mitigates the wear problem, while at the same time it improves the transmitting and receiving efficiency by actually precluding a carbon buildup and also by sealing the transmitting and receiving means from dust. In the second mode the sensing heads are mutually spaced apart in a direction normal to the flat surface of the document by a distance which exceeds the document thickness by approximately 0 to 0.4 millimeters. It has been found that the ultrahigh molecular weight polyethylene film actually produces a focusing effect, thus, accurate reading of marks on the document can still be achieved in this mode, yet the amount of wiping against the sensing heads and the resulting head wear is greatly reduced.

In a preferred embodiment optical fibers are lodged in the sensing head to transmit radiation from a radiation source onto a document and sense radiation reflected back from marks on the document for delivery to a readout means. The fibers are arranged with one end substantially flush with the surface of a V-shaped apex formed on the body portion of the heads. A substantially transparent, ultra high molecular weight polyethylene tape is secured to the body portion overlying the apex and extending down either side thereof by means of an adhesive layer on one side of the tape. The overall thickness of the tape is within the approximate range of 0.075 – 0.25 millimeters, and preferably about 0.18 millimeters. A plurality of transmitting and receiving fiber optic pairs are distributed along the apex to detect multiple marks on a document.

DESCRIPTION OF THE DRAWINGS

Further advantages and features of the invention will be apparent to those skilled in the art from the ensuing detailed description thereof, taken together with the accompanying drawings, in which:

FIG. 3 is a perspective view of a sensing head in reading position over a document, with a portion of the head cut away to show the radiation transmitting and receiving means;

FIG. 4 is a sectional view of the read portion of a sensing head; and

FIGS. 5 and 6 are frontal elevation views showing a pair of sensing heads positioned respectively to cause a document to wrap around the sensing heads in wiping contact therewith, and to permit a document to pass between the heads without a constant wiping action.

DESCRIPTION OF THE PREFERRED EMBODIMENT

Figure 1:
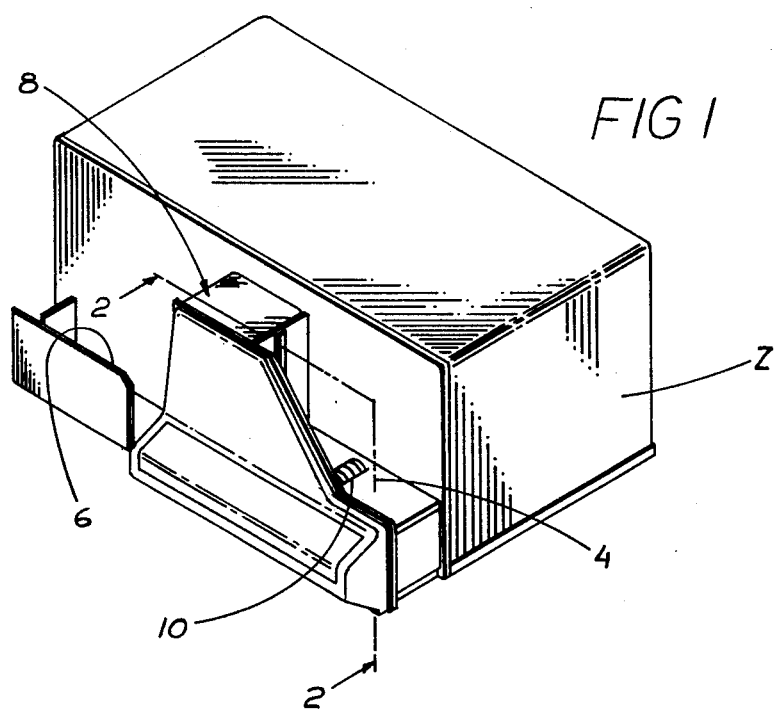
FIG. 1 is a perspective view of a document reader embodying the present invention.

A device for reading marks placed on documents such as computer cards is shown in FIG. 1. Major components of the reader include a cover member 2, a card input hopper 4, a card output hopper 6, and a mark reading section 8.

Figure 2:
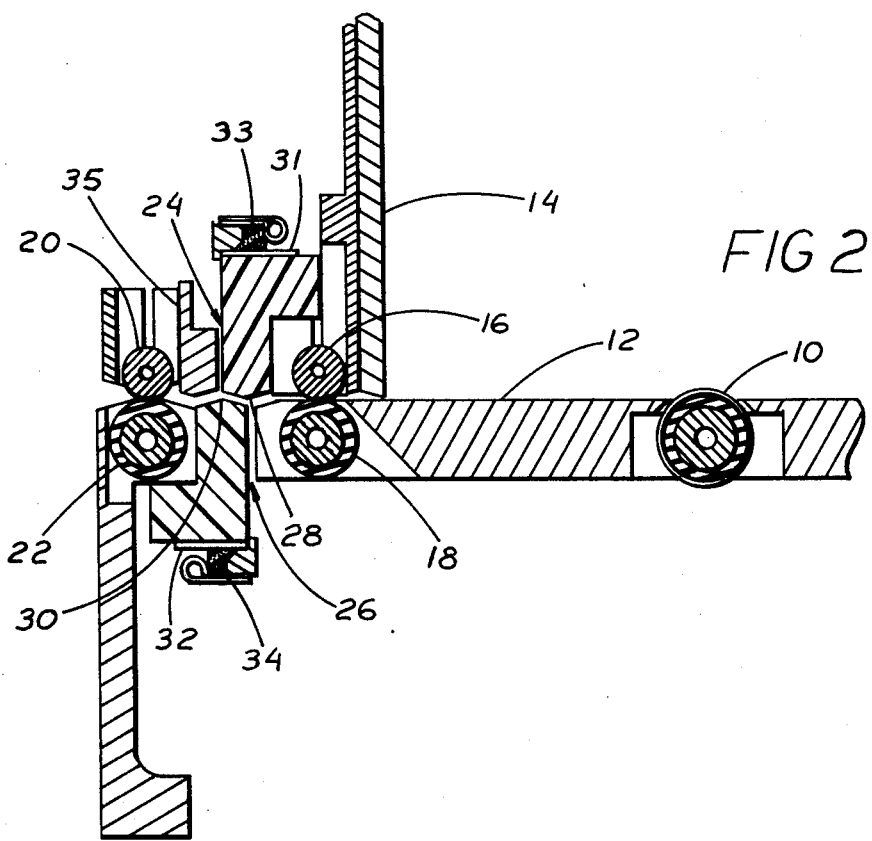
FIG. 2 is a sectional view of the transport and read mechanism taken along the line 2—2 of FIG. 1.

The arrangement of the card transport and read mechanisms is shown in FIG. 2. A feed roller 10 protrudes through the input card hopper floor 12 to feed the bottommost card in a stack under pick knife 14, which assures that only one card at a time is fed into the reader. A first drive roller 16 cooperates with an idler roller 18 to drive cards into the read area, while a second drive roller 20 cooperates with a second idler roller 22 to draw cards fully out of the read area and into output hopper 6. Appropriate motors (not shown) are provided to power the various feed and drive wheels. The card transport mechanism is essentially similar to that described in U.S. Pat. No. 3,801,776 to Goeppinger and Guthrie, entitled "Optical Mark Sense Reader for Tab Cards", dated Apr. 2, 1974 and assigned to the assignee of the present invention, the contents of which patent are hereby incorporated herein by reference.

A pair of mark sensing heads 24 and 26 are positioned between the drive rollers 16 and 20, sensing head 24 being oriented downward to read the upper surface of a card and sensing head 26 being oriented upward to read the card's lower surface. Each of the sensing heads 24 and 26 terminates in a shallow V-shaped apex 28 and 30, respectively, in order to guide the cards between the heads. The reading ends of the heads could also terminate in apices formed by curved surfaces, a slant, or other shapes, so long as proper card guidance is achieved, or a separate fixture could be provided to guide the cards between the heads. Lodged inside the heads are optical sensing means described hereinafter, which terminate in the vicinity of the head apices. At the opposite ends of sensing heads 24 and 26 from their apices are printed circuit boards 31 and 32, respectively. Each board contains a plurality of photoelectric sensors which receive light from the optical sensing means and produce electrical signals corresponding to the light intensities. Foam rubber pads 33 and 34 are positioned over the boards to prevent exterior light from reaching the photoelectric sensors. The sensing heads are laterally offset from each other in the direction of document travel and may be provided with means to adjust their position up or down relative to the document transport path. A passive head 35 is positioned downstream from sensor head 26 to prevent the cards from flicking upward as they leave the read area.

Referring now to FIG. 3, the upper sensing head 24 is shown in operative position over an information card 36 which has an array of blanks 37 on its upper surface. The card is coded in the usual fashion by marking selected blanks with reflection-retardant marks 38 such as graphite imprints or punched holes. Lower sensing heads 26, identical in construction to upper head 24, is positioned to read a similar display of marks on the lower surface of card 36. Sensing head 24 comprises a body portion 40 at one end of which is a lamp assembly 42 which provides a source of radiation, preferably in the near infrared region of the electromagnetic spectrum. Body portion 40 includes an upper readout level 44, a lower sensing level 46, and an intermediate cavity sealed with a resinous material 48. A plurality of slots 50 are provided on one side of sensing level 46 about half way through the sensing head to the region of apex 28. Slots 50 are spaced such that each slot is positioned over a line of blanks 37 on card 36. A plurality of transmitting optical fiber bundles 52 corresponding in number to slots 50 are embedded in resinous material 48 with one end positioned for illumination by lamp assembly 42 and their other ends lodged respectively in each of slots 50, one bundle to a slot. A similar number of receiving optical fiber bundles 54 have one end lodged in each of slots 50 respectively and their other ends lodged in corresponding slots 56 formed in the upper readout level 44. Printed circuit board 31 includes a separate photoelectric sensor aligned with the upper end of each receiving fiber bundle 54 and adapted to be illuminated thereby.

Each of the fiber optic bundles 52 and 54 includes a plurality of small diameter fiber optic strands, preferably formed from a glass material 1 to 2 millimeters in diameter. A separate bundle of strands and corresponding photoelectric sensor (not shown) may be provided to monitor the intensity of lamp 42.

With lamp 42 on, radiation is transmitted by transmitting fiber bundles 52 to the vicinity of apex 28 and radiated therefrom onto card 36. Radiation is reflected back from the card to each of the receiving fiber bundles 54 and delivered thereby to the corresponding photoelectric sensors in circuit board 31, which sensors produce an electrical output having a magnitude determined by the quantity of radiation delivered by receiving fiber bundles 54. The photoelectric sensor outputs are amplified and the amplified signals used to determine the presence or absence of a mark under each of the receiving fiber bundles 54. As a mark 0eflects less radiation than does the bare card, the presence of a mark is detected by delivering the amplified sensor output to a threshold circuit.

The elements contained in each of the lower sensing level slots 50 are shown in greater detail in FIG. 4. It is seen that slot 50 terminates in the vicinity of apex 28. Optical fiber bundles 52 and 54 are held against the inner wall of slot 50 by a plastic plug 60 which is tightly inserted into the slot. Similar plugs hold receiving fiber bundles 54 in slots 56 at the upper readout level. Fiber bundles 52 and 54 extend down through slot 50 and terminate at a location substantially flush with the lower surface of body portion 40 and approximately over apex 28.

Affixed to the underside of body portion 40 and extending away from apex 28 on either side thereof so as to overlie fiber bundles 52 and 54 is a thin film of ultra high molecular weight (UHMW) polyethylene 62, a highly abrasion-resistant material with a typical density of 0.94 grams/cm.³, having an overall thickness in the approximate range of 0.075 to 0.25 millimeters (mm.), and preferably about 0.18 mm. A suitable film may be obtained in the form of an adhesive tape such as plastic film tape No. 5421 manufactured by 3M Company under the registered trademark SCOTCH. The polyethylene layer of this tape is approximately 0.125 mm. thick and the adhesive layer 0.05 mm., for a total film thickness of approximately 0.175 mm. Other UHMW polyethylene films or tapes could be used so long as both their polyethylene and adhesive layers are substantially transparent at the radiating frequency of lamp 42, i.e., they do not seriously impede the transmission of radiation through the tape to a marked card and from the card back to the sensing head.

FIG. 5 illustrates an operating mode known in the prior art in which sensing heads 24 and 26 are positioned such that they slightly overlap in a direction normal to a card surface. By "overlapping" it is meant that the sensing heads extend into the card transport path, i.e., they force the cards to bend slightly away from a straight line path during transit past the heads. This is accomplished either by positioning the apex 28 of upper sensing head 24 below the apex 30 of lower sensing head 26, or by separating the two sensing head apices in a direction normal to the card surface but by an amount less than the card thickness. In this mode the leading end of a card 36 is first pushed down by apex 28 and then up by apex 30 as it moves past the sensing heads. As a result the card is forced into a shallow "S" curve and wipes over at least a portion of its length directly against each of the apices 28 and 30. This has proven to be very useful in preventing movements of the cards away from the sensing heads and the attendant difficulties in reading the cards. As a consequence of the wiping action, however, prior sensor heads have become worn down so that the optical fibers are exposed and themselves become worn and dirty. This in turn has altered the sensitivity of the fibers, requiring the return signal amplification circuit to be retuned after an initial 50,000 cards or so and again after each subsequent 100,000 to 250,000 cards until eventual failure of the head. With the sensing head of the present invention, in which the cards are spaced from the optical fibers by substantially the UHMW polyethylene film thickness, it has been found that standard 0.007 inch thick cards appear to have a polishing effect as they wipe against the film. The amplification circuit requires fine tuning after about 10,000 cards, but does not have to be returned thereafter until the film is replaced. With the No. 5421 tape described above, it was found that after reading 321,000 cards about one-third of the tape had been worn away. Convenient and inexpensive maintenance of the sensing heads is made possible by merely removing the tape after a suitable number of cards have been read and replacing it with a section of new tape, rather than having to replace the entire head.

It has also been discovered that the problem of carbon buildup on the optical fibers caused by wiping the card marks against the fibers is substantially eliminated when the UHMW polyethylene film is introduced. Although the cause of this phenomenon is not precisely understood, it is believed that the smoothness of the film reduces the amount of carbon that otherwise would be deposited, and also that the abrasive wiping action of the cards actually cleans the film to prevent any accumulation of carbon.

In addition to greatly reducing wear on the sensing heads due to its excellent abrasion-resistant qualities, the provision of a UHMW polyethylene film actually enables the sensing heads to be operated in a different mode from the above which further reduces wear on the heads but has heretofore been difficult to achieve because of optical problems. In this second mode, illustrated in FIG. 6, the reading ends of sensing heads 24' and 26' are flat and do not overlap. Instead they are spaced apart in a direction normal to the card surface by an amount ranging from the card thickness to the card thickness plus about 0.4 mm. This permits a card 36' to pass between the sensing heads in substantially a straight line path. The UHMW polyethylene film adjacent the optical fibers 52 and 54 has been found to produce a focusing effect such that an accurate readout can be obtained over this gap range. With the film 62 described above, reading sensitivity peaks with a gap approximately 0.2 mm. greater than the card thickness, or 0.1 mm. between the card and each of the sensing heads. By thus substantially eliminating the wiping action of the card against the sensing heads, the primary cause of head wear is greatly reduced independent of the greater wear qualities of the UHMW polyethylene film. Because card wrap about the sensing heads is eliminated, the heads can terminate along a flat surface, although termination along an apex may still be used for card guidance purposes. The small clearance between the card transport path and each of the sensing heads does not completely eliminate head wiping caused by random movements of the cards out of their ideal path. The wear effect of this wiping, however, is considerably less than that experienced when the sensing heads overlap, and has the beneficial side effect of removing dust from the heads.

While particular embodiments of the invention have been shown and described, numerous additional modifications and variations are possible in light of the above teachings. It is therefore intended that the scope of the invention be limited only in and by the terms of the appended claims.

What is claimed is:

1. In a document reader having a radiation source, a sensing head for directing radiation from said source onto a document and sensing radiation reflected back from the document, a readout means for producing a readout corresponding to the sensed radiation, and means for driving a document past said sensing head, wherein the improvement comprises a sensing head comprising:

a body portion, transmitting means lodged in said body portion for transmitting radiation from said source onto a passing document, receiving means lodged in said body portion for receiving radiation reflected by a document and direction said radiation to said readout means, and a substantially transparent, ultra high molecular weight polyethylene film secured to said body portion and overlying said transmitting and receiving means to separate a document being read from said body portion by substantially the film thickness.

2. The invention of claim 1, said reader being of the type in which a document being read is caused to wipe against an area on the sensing head, wherein said film is adapated to receive a wiping motion from a document being read, and said transmitting and receiving means are lodged in said body portion proximate to the document wiping area of said film.

3. The invention of claim 1, wherein said document reader is of the type in which a document being read is normally spaced from said sensing head.

4. The invention of claim 1, wherein said transmitting and receiving means comprise optical fibers lodged in said body portion with terminating ends substantially flush with the surface of said body portion and adjacent to said film.

5. The invention of claim 4, wherein said body portion forms an apex in the vicinity of the terminating ends of said fibers, said film overlying said apex and extending down either side thereof.

6. The invention of claim 5, said body portion forming substantially a V-shape at said apex.

7. The invention of claim 4, and further including a plurality of mutually spaced transmitting and receiving optical fiber pairs, each of said pairs having ends terminating substantially flush with the surface of said body portion and adjacent to said film.

8. A sensing head suitable for use in a document reader, said head comprising a body portion, transmitting means lodged in said body portion for transmitting radiation from a radiation source onto a document passed by the sensing head, receiving means lodged in said body portion for receiving radiation reflected off the document, and a substantially transparent, ultra high molecular weight polyethylene film secured to said body portion and overlying said transmitting and receiving means.

9. The invention of claim 8, wherein said transmitting and receiving means comprise optical fibers.

10. The invention of claim 9, each of said optical fibers having an end substantially flush with the surface of said body portion and adjacent to said film.

11. The invention of claim 10, wherein said body portion forms an apex in the vicinity of said terminating fiber ends, said film overlying said apex and extending down either side thereof.

12. The invention of claim 11, and further including a plurality of mutually spaced transmitting and receiving optical fiber pairs lodged in said body portion with terminating ends distributed along said apex.

13. Apparatus for reading marks on both sides of a document, comprising:

a radiation source, a pair of mark sensing heads oriented in mutually opposite directions to read opposite sides of a document transported between them, each of said heads comprising a body portion, at least one pair of transmitting and receiving means for respectively transmitting radiation from said source onto a document transported between the heads, receiving radiation reflected off a document, and directing, said radiation to said readout means, and a substantially transparent, ultra high molecular weight film secured to said body portion and overlying said transmitting and receiving means pairs, a readout means for producing a readout corresponding to the received radiation, and means for transporting a document between said sensing heads.

14. The invention of claim 13, wherein said sensing heads are laterally offset from each other in the direction of document travel and mutually overlapping in a direction generally normal to the flat surface of a document transported between them so as to cause the document to wipe against said sensing head films proximate to said transmitting and receiving means and thereby limit document movement away from the transporting path, each of the sensing head body portions forming an apex with said transmitting and receiving means terminating at said apex and said film overlying said apex and extending down either side thereof.

15. The invention of claim 13, wherein said sensing heads are mutually spaced apart in a direction normal to the flat surface of a document transported between them by a distance at least equal to the document thickness.

16. The invention of claim 15, wherein said spacing between the sensing heads is within the approximate range of 0 - 0.4 millimeters greater than the document thickness.

17. The invention of claim 16, wherein said spacing between the sensing heads is approximately 0.2 millimeters greater than the document thickness.

18. The invention of claim 13, wherein said transmitting and receiving means for each sensing head respectively comprise an optical fiber bundle having a first end adapted to receive radiation from said source and a second end substantially flush with the surface of said body portion adjacent to said film, and an optical fiber bundle having a first end substantially flush with the surface of said sensing head adjacent to said film and a second end adapted to deliver radiation to said readout means.

* * * * *

UNITED STATES PATENT OFFICE
CERTIFICATE OF CORRECTION

Patent No. 4,052,594　　　　　　　　　　Dated October 4, 1977

Inventor(s) Loren Roger Davis

It is certified that error appears in the above-identified patent and that said Letters Patent are hereby corrected as shown below:

Column 4, Line 56:　"Oeflects" should read -- reflects --

Column 5, Lines 56/57:　"returned" should read -- retuned --

Column 6, Lines 62/63:　"direction" should read -- directing --

Column 7, Line 4:　"adapated" should read -- adapted --

Column 8, Line 9:　"directing," should read -- directing -- (comma should be removed)

*Signed and Sealed this*

*Twenty-first* Day of *February 1978*

[SEAL]

Attest:

RUTH C. MASON　　　　　　　　　　LUTRELLE F. PARKER
*Attesting Officer*　　　　　　　*Acting Commissioner of Patents and Trademarks*